(12) United States Patent
Raby et al.

(10) Patent No.: US 11,910,454 B2
(45) Date of Patent: Feb. 20, 2024

(54) METHOD FOR ASSOCIATING A NEW GATHERING NODE IN A DISTRIBUTED WIRELESS NETWORK

(71) Applicant: SAGEMCOM BROADBAND SAS, Rueil Malmaison (FR)

(72) Inventors: Florent Raby, Rueil Malmaison (FR); Clément Toche, Rueil Malmaison (FR); Massinissa Lalam, Rueil Malmaison (FR); Jean-Philippe Jaulin, Rueil Malmaison (FR)

(73) Assignee: SAGEMCOM BROADBAND SAS, Bois-Colombes (FR)

( * ) Notice: Subject to any disclaimer, the term of this patent is extended or adjusted under 35 U.S.C. 154(b) by 167 days.

(21) Appl. No.: 17/053,258

(22) PCT Filed: May 28, 2019

(86) PCT No.: PCT/EP2019/063718
§ 371 (c)(1),
(2) Date: Nov. 5, 2020

(87) PCT Pub. No.: WO2019/229016
PCT Pub. Date: Dec. 5, 2019

(65) Prior Publication Data
US 2021/0289574 A1 Sep. 16, 2021

(30) Foreign Application Priority Data
May 31, 2018 (FR) ........................................ 1854677

(51) Int. Cl.
*H04W 4/00* (2018.01)
*H04W 76/15* (2018.01)
(Continued)

(52) U.S. Cl.
CPC ........... *H04W 76/15* (2018.02); *H04W 76/12* (2018.02); *H04W 84/18* (2013.01); *H04W 84/12* (2013.01); *H04W 88/08* (2013.01)

(58) Field of Classification Search
CPC ..... H04W 76/15; H04W 76/12; H04W 84/18; H04W 84/12; H04W 88/08; H04W 24/02
See application file for complete search history.

(56) References Cited

U.S. PATENT DOCUMENTS

2014/0204727 A1 7/2014 Gu et al.
2017/0135104 A1 5/2017 Emmanuel et al.
(Continued)

OTHER PUBLICATIONS

Jul. 8, 2019 International Search Report issued in International Patent Application No. PCT/EP2019/063718.
"Wi-Fi Protected Setup;" Wikipedia; May 4, 2018.

*Primary Examiner* — Omoniyi Obayanju
(74) *Attorney, Agent, or Firm* — Williams Mullen; R. Brian Drozd

(57) ABSTRACT

A method for associating a new gathering node in a distributed wireless communication network, each gathering node includes at least one access-point radio-frequency interface and/or a user node of a so-called gathering wireless network associated with the communication network, the method being performed by a management node of the network and including the steps of receiving a message which include information that a new gathering node is to be associated, sending a command activating a so-called association radio-frequency interface, receiving a message indicating that a new gathering node is associated with an existing gathering node, determining a first validation of association of the new gathering node, and, if the association is validated, then sending, to the new gathering node, information on param- (Continued)

eterisings includes information necessary for an association of the new node with the gathering wireless network of the network.

10 Claims, 4 Drawing Sheets

(51) Int. Cl.
  *H04W 76/12* (2018.01)
  *H04W 84/18* (2009.01)
  *H04W 84/12* (2009.01)
  *H04W 88/08* (2009.01)

(56) References Cited

U.S. PATENT DOCUMENTS

2017/0272273 A1   9/2017  Singla et al.
2019/0394643 A1*  12/2019 Townend .............. H04W 12/06

* cited by examiner

METHOD FOR ASSOCIATING A NEW GATHERING NODE IN A DISTRIBUTED WIRELESS NETWORK

The present invention relates to the field of wireless communication networks in accordance with one of the IEEE (Institute of Electrical and Electronics Engineers) 802.11 standards, that is to say the wireless communication networks commonly referred to as Wi-Fi networks. The present invention relates more particularly to a method for associating a new node in a Wi-Fi network.

A wireless communication network (hereinafter "network") in accordance with one of the IEEE 802.11 standards typically comprises a plurality of nodes. Each node is an electronic device comprising at a minimum a radio-frequency module allowing the establishment of communications in accordance with one of the IEEE 802.11 standards, or in other words in accordance with one of the Wi-Fi standards. Such a network typically comprises a so-called master electronic device, commonly referred to as an access point (AP) and a plurality of so-called user (or client) electronic devices able to establish wireless connections with the access point and/or with each other. In a residential environment, the master electronic device, or access point, is typically a "box" provided by an internet operator, that is to say a home gateway or residential gateway. The user electronic devices are typically computers, televisions, tablets or so-called smartphones. It is thus commonly said that the user electronic devices are associated "in Wi-Fi" with the access point.

The architecture of a Wi-Fi network may also be distributed, in order for example to extend the range of the network or to increase the performance thereof, through the use of a plurality of access points. The architecture of a distributed Wi-Fi network is different from the previous architecture briefly described, a distributed Wi-Fi network comprising at a minimum two networks:
- a so-called gathering or "backhaul" network, making it possible to connect the access points to each other and to constitute a network infrastructure in accordance with a network architecture of the mixed star and/or chain type, this gathering network may be a wireless network (for example Wi-Fi), a cabled network (for example Ethernet) or a mixture of the two,
- a so-called user (or client) ("fronthaul") Wi-Fi network, allowing a connection of so-called user (or client) nodes (or electronic devices) to the distributed Wi-Fi network.

Figure 1:
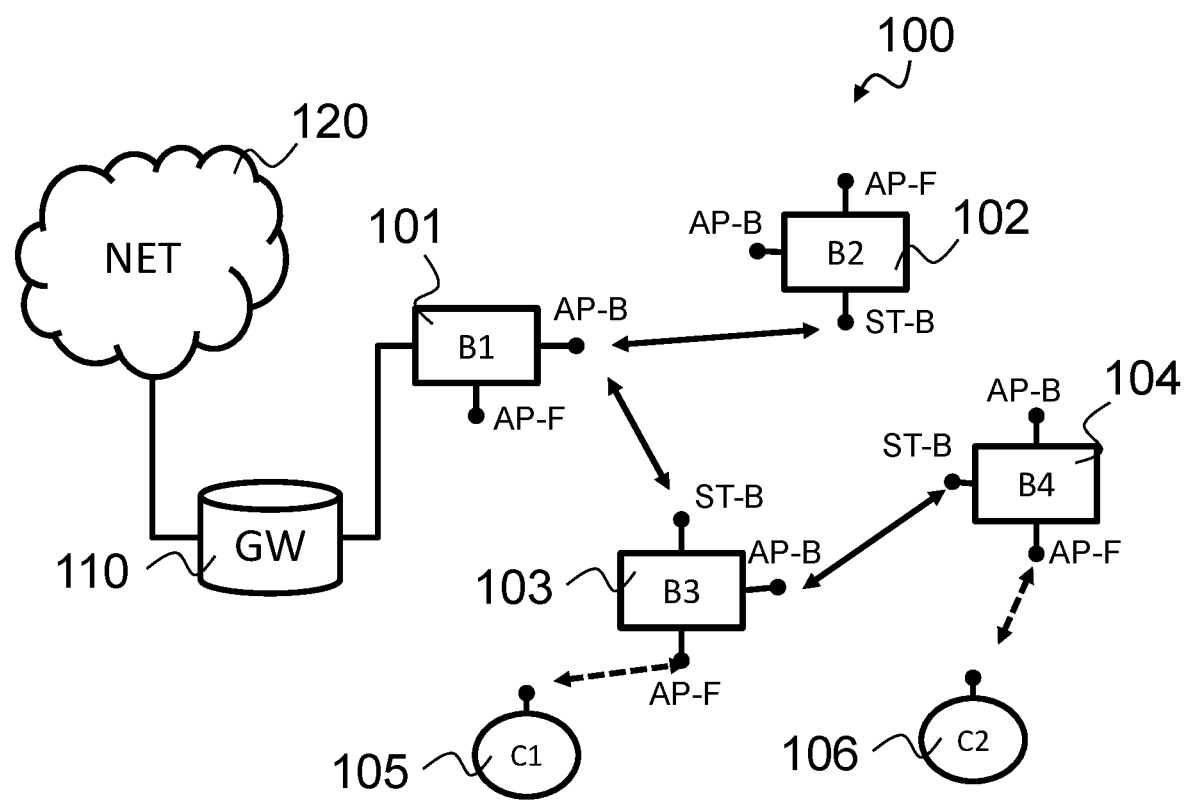

FIG. 1 illustrates highly schematically such a distributed Wi-Fi network 100. The distributed network 100 comprises a gateway 110 and a plurality of nodes or electronic devices B1 101, B2 102, B3 103, B4 104, C1 105 and C2 106. The gateway 110 allows interconnection of the network 100 with a network 120, for example the internet. In this example, the nodes B1, B2, B3 and B4 are so-called gathering nodes. These nodes B1, B2, B3 and B4 constitute the backhaul infrastructure of the network 100. The nodes C1 and C2 are user nodes connected to gathering nodes (respectively the nodes B3 and B4). The gathering nodes B1, B2, B3 and B4 manage two Wi-Fi networks:
- a first Wi-Fi network, dedicated to gathering, enables each gathering node to be associated with the distributed network 100, possibly in a chain,
- a second Wi-Fi network is dedicated to the association of the user nodes, in a similar fashion to a non-distributed Wi-Fi network.

Thus each node B1, B2, B3 and B4 in the infrastructure comprises a plurality of radio interfaces:
- a radio interface referred to as AP-B (standing for "access point backhaul") corresponding to an access-point interface of the Wi-Fi network dedicated to gathering,
- an "STA-B" (standing for "station backhaul") radio interface corresponding to a user (or client) interface of the Wi-Fi network dedicated to gathering,
- an "AP-F" (standing for "access point fronthaul") radio interface corresponding to an access-point interface of the Wi-Fi network dedicated to the association of user nodes of the distributed network 100.

In the example illustrated in FIG. 1, the node B1 101 is connected by cable to the gateway GW 110, for example via an Ethernet connection. According to one embodiment, the connection between the gateway GW 110 and the node B1 101 may be made by a Wi-Fi connection. According to a complementary embodiment of the invention, the gateway GW 110 and the node B1 101 are one and the same electronic device, said electronic device comprising the functionalities of the gateway GW 110 and of the node B1 101.

Each gathering node B1, B2, B3 or B4 can therefore possibly establish a connection to another gathering node in order to constitute the gathering infrastructure of the distributed network 100. More precisely, a gathering node may, via its STA-B radio interface, establish a connection to an AP-B radio interface of another gathering node in order to constitute a chain of gathering nodes. It should be noted that, according to a complementary embodiment of the invention, some gathering nodes may be connected via a cabled connection, for example of the Ethernet type.

An AP-B radio interface, an access point of the Wi-Fi network dedicated to gathering, establishes a Wi-Fi network associated with an SSID («Service set identifier») corresponding to the gathering network. This SSID may be masked, that is to say it is not broadcast by the AP-B radio interface of the gathering nodes. A gathering node must therefore know this SSID in order to establish a Wi-Fi connection to another gathering node. The gathering Wi-Fi network is possibly protected by a security key (for example in accordance with a WPA (standing for Wi-Fi protected access) mechanism, a security key that also requires being known to the gathering nodes. A gathering node is adapted for retransmitting the traffic (that is to say the data, exchanged in messages) received via its user and gathering "access-point" radio interfaces to its gathering "user" radio interface in order to transfer the traffic received to a central node of the distributed network, here the node B1 101. Likewise, a gathering node is adapted for redistributing the traffic received via its "user" gathering radio interface to one or other or both of its "access point" user and gathering radio interfaces. In other words, in the example illustrated in FIG. 1, the gathering node B3 103 is adapted for:
- receiving traffic gathered by the node B4 101 via its AP-B radio interface,
- receiving traffic from connected user nodes, for example the user node C1 105, via its AP-F interface,
- retransmitting said traffic received to the gathering node B1 101 via its ST-B user gathering radio interface, and
- conversely, redirecting traffic received via its ST-B user gathering radio interface to the node B4 104 via its AP-B interface and/or the gathering node B1 101 via its ST-B user gathering radio interface.

There exist methods affording an easy configuration of user nodes for connecting them to a Wi-Fi network. Thus the WFA (standing for Wi-Fi Alliance) has defined so-called WPS (standing for Wi-Fi Protected Setup) methods making it possible to easily associate a new user node with an existing Wi-Fi network. These methods, based for example on pressing on a button of a node and/or entering a code, enable a new user node to be associated in a distributed network such as the distributed network 100. These methods are however not adapted for adding a new gathering node in a distributed network such as the distributed network 100. This is because these methods sometimes require actions to be performed by a user in a short time on an existing node of the network and on the new node, whereas the new node may possibly be distant from the existing node. These methods may require the entry of a code even though the new node does not have an adapted interface.

Other methods have been proposed, but these methods are often impractical to be implemented by a user, or are based on technical prerequisites making these methods inapplicable for existing distributed networks (for example the need for a radio interface of a particular type, not present on the majority of electronic devices complying with the Wi-Fi standard).

It is therefore necessary to propose a method for overcoming these drawbacks.

The invention relates to a method for a distributed wireless communication network comprising at least one gathering node, each gathering node comprising at least one access-point and/or user radio-frequency interface of a so-called gathering wireless network associated with a communication network and an access-point radio frequency interface of a so-called user wireless network associated with the communication network, in order to associate a new gathering node, the method being executed by a management node of the communication network and comprising the steps of:

receiving a message comprising information that a new gathering node is to be associated, sending, to each gathering node in the communication network, a command to activate a predefined so-called association radio-frequency interface, receiving a message indicating that a new gathering node is associated with an existing gathering node via its so-called association radio-frequency interface, determining a first validation of association of the new gathering node, if the association is validated, then sending to the new gathering node information on parameterisings comprising at least information necessary for an association of the new node with the gathering wireless network of the communication network.

According to a complementary embodiment of the invention, the command activating the predefined association radio-frequency interface comprises:

a command activating a radio-frequency interface of the access-point type, or a command activating a radio-frequency interface of the user type.

According to a complementary embodiment of the invention, the message comprising information that a new gathering node is to be associated comprising information associated with the new gathering node to be associated, the method comprises a step prior to the sending of the command activating the predefined so-called association radio-frequency interface:

determining a second validation of association of the new gathering node with the communication network according to the information associated with the new gathering node to be associated and according to an identifier associated with the communication network, and ignoring the following steps of the method in the event of the lack of a second validation.

According to a complementary embodiment of the invention, the message comprising information that a new gathering node is to be associated comprising configuration information for a so-called association radio-frequency interface, the command activating a predefined so-called association radio-frequency interface comprises said configuration information.

According to a complementary embodiment of the invention, the method comprises a step, following the step of receiving a message indicating that a new gathering node is associated with an existing gathering node via its so-called association radio-frequency interface, of:

establishing a secure connection between the management node and the new gathering node.

According to a complementary embodiment of the invention, the new gathering node comprising a radio tag, the radio tag comprising the information associated with the new gathering node to be associated, at least one gathering node of the communication network comprising a radio-tag reader, the message comprising information that a new gathering node is to be associated is sent by the gathering node comprising the radio-tag reader following the reading of the radio tag and comprises the information associated with the new gathering node to be associated.

The invention also relates to a management node of a distributed wireless communication network, the communication network comprising at least one gathering node, each gathering node comprising at least one access-point and/or user radio-frequency interface of a so-called gathering wireless network associated with the communication network and an access-point radio-frequency interface of a so-called user wireless network associated with the communication network, the management node being adapted for executing the steps of the method described in the present document.

According to a complementary embodiment of the invention, the management node is one of the gathering nodes of the distributed wireless communication network.

The invention also relates to a gathering node of a distributed wireless communication network, the gathering node comprising at least one radio-frequency module adapted for a radio-frequency interface configuration, the gathering node comprising a radio tag, the radio tag comprising information on parameterising of a so-called association wireless network, the gathering node being adapted for, following a powering up:

detecting the presence of a so-called association wireless network, associating itself with the so-called association wireless network detected, receiving information on parameterisings comprising at least information necessary for an association of the gathering node with a gathering wireless network of a communication network, configuring the radio-frequency module in order to establish a user radio-frequency interface of the gathering wireless network.

The invention also relates to a computer program that can be stored on a medium and/or downloaded from a communication network in order to be read by a processor of a node of a distributed wireless communication network. This computer program comprises instructions for implementing all or some of the steps of the method for associating a gathering node, when said program is executed by the processor.

The invention also relates to an information storage medium or recording medium comprising such a computer program.

Figure 2:
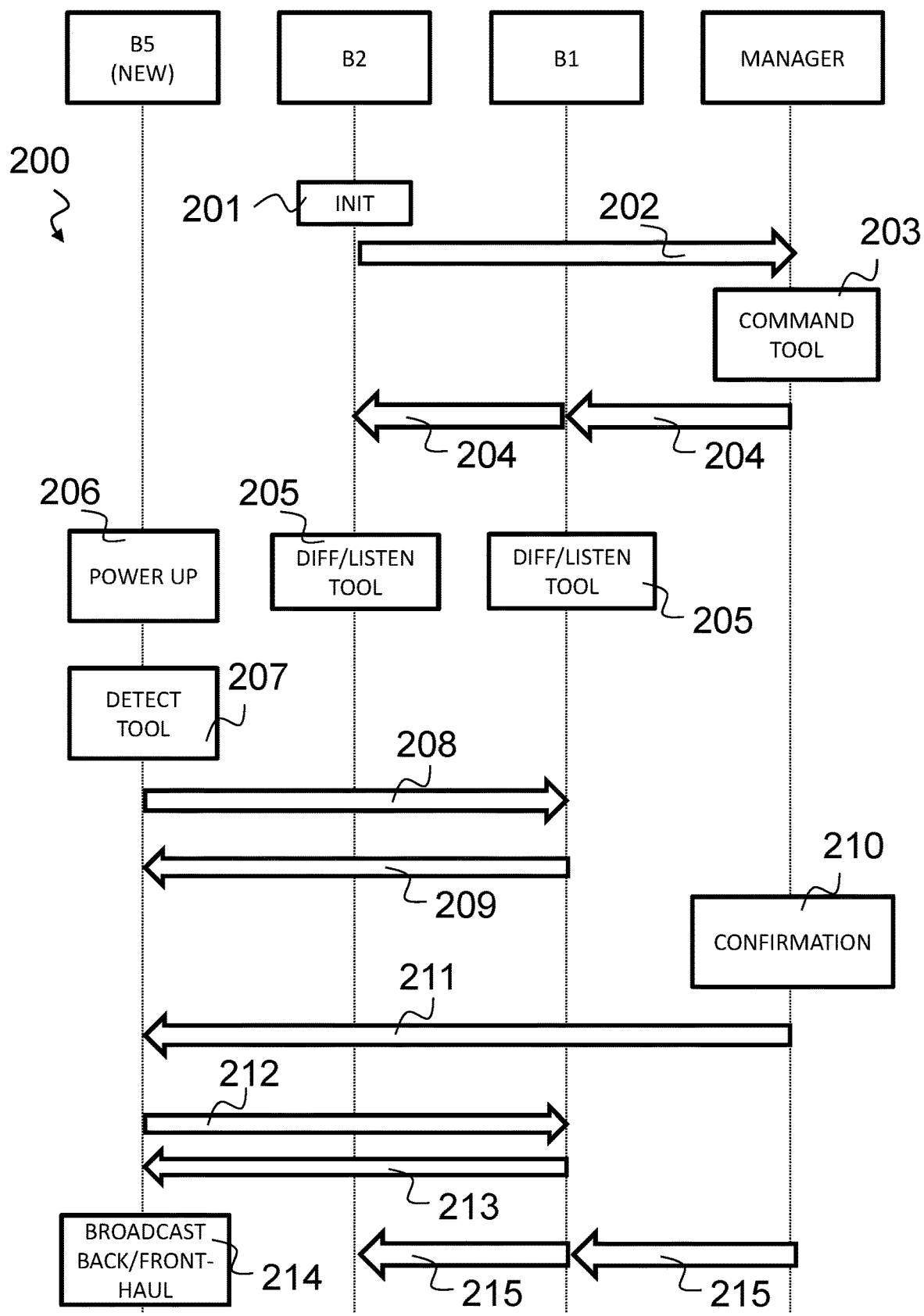
Figure 3:
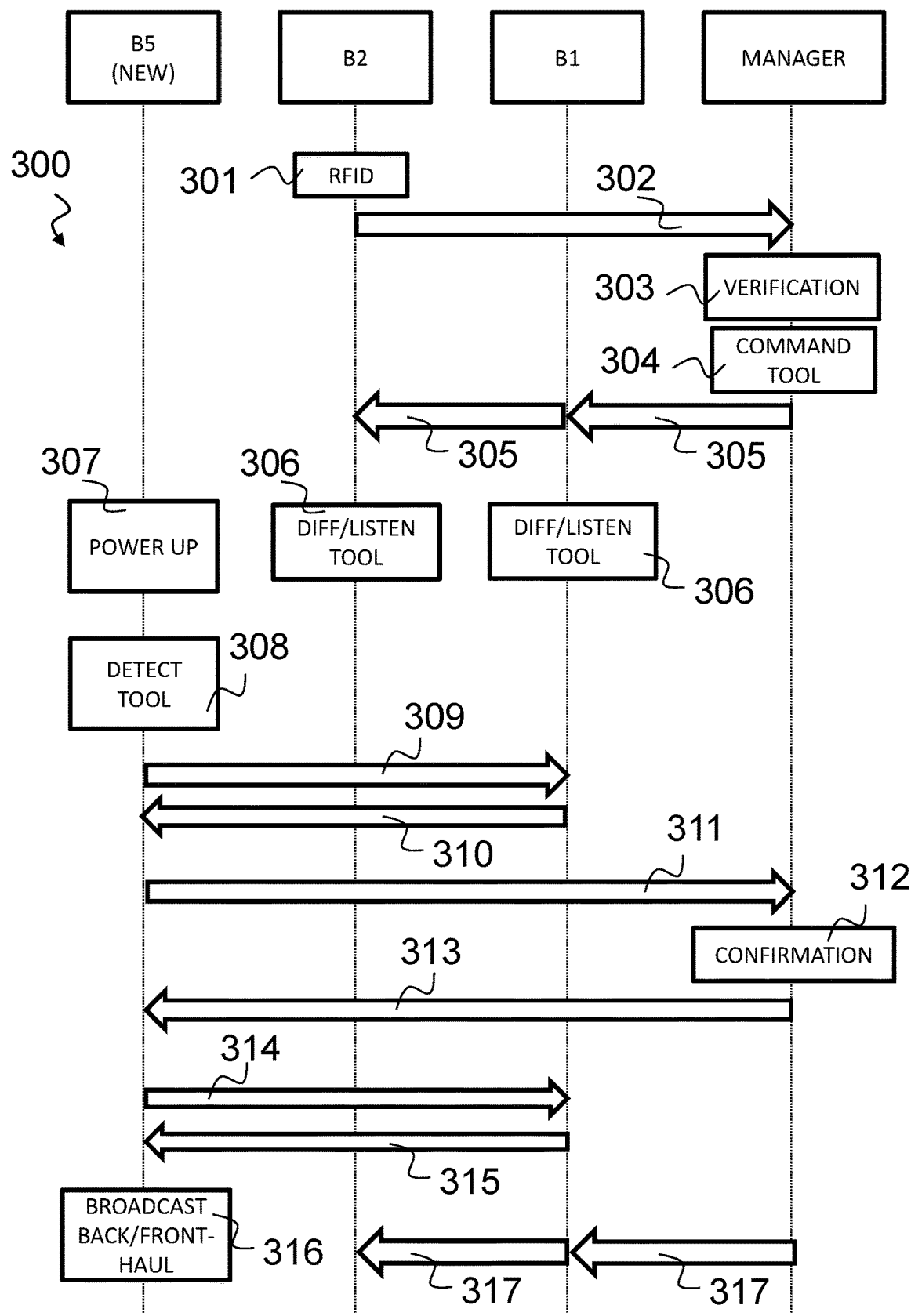
Figure 4:
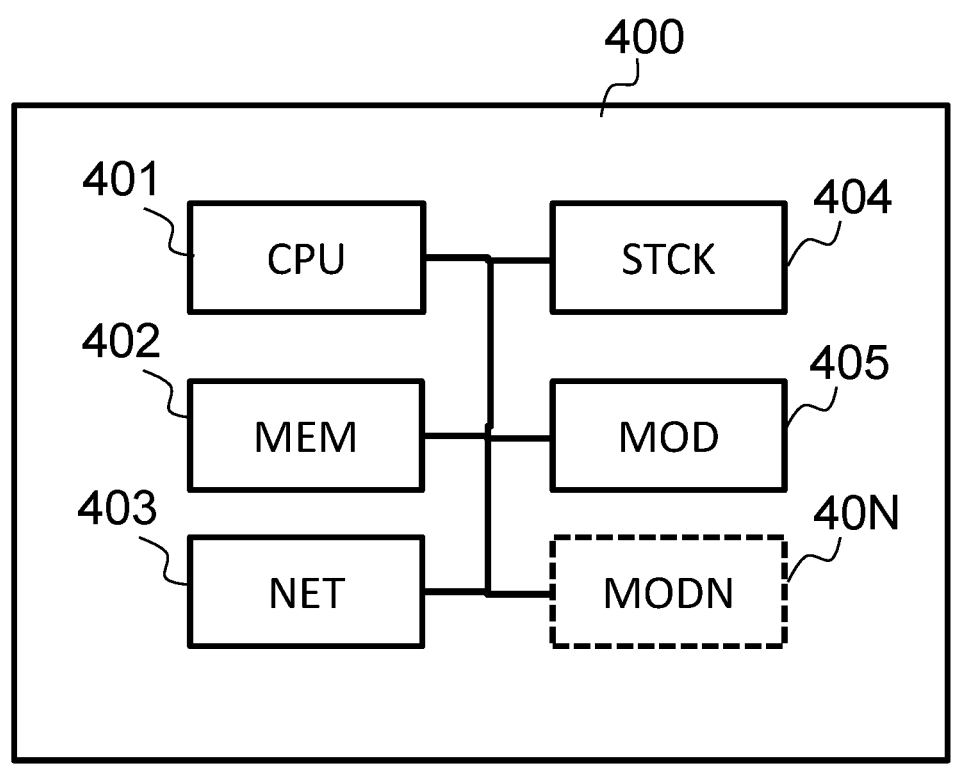

The features of the invention mentioned above, as well as others, will emerge more clearly from the reading of the following description of an example embodiment, said description being given in relation to the accompanying drawings, among which:

FIG. 1 illustrates schematically the architecture of a distributed wireless communication network comprising a plurality of nodes, for example in accordance with an IEEE 802.11 standard, FIG. 2 illustrates schematically a method for associating a gathering node in a distributed wireless communication network, according to a first embodiment of the invention, FIG. 3 illustrates schematically a method for associating a gathering node in a distributed wireless communication network, according to a second embodiment of the invention, FIG. 4 illustrates schematically the hardware architecture of a gathering node of a distributed wireless communication network, the gathering node being adapted for performing all or some of the steps of the methods illustrated in FIG. 2 or in FIG. 3.

The invention enables a new gathering node of a distributed wireless communication network to be integrated and configured in a simple and secure fashion by a user of the distributed network. The gathering node, once configured, is associated with the gathering network and itself becomes a possible point of access to said gathering network. The gathering node may also be configured so as to be a point of access to the user wireless network allowing an association of user nodes with the distributed wireless communication network.

The invention makes it possible to check, when a new gathering node is added, that this operation is indeed required—and enabled—by a user of the distributed network. The invention allows an automatic configuration of the gathering node, in order that it can be integrated in the gathering infrastructure and can gather the traffic of user nodes of the distributed network.

In the methods 200 and 300 illustrated hereinafter in FIG. 2 and FIG. 3, the network 100 comprises a so-called management node. The functions of said management node can be integrated in one of the gathering nodes of the network 100, for example the so-called central node B1 101, or be integrated in a dedicated electronic device of the network 100. According to another embodiment of the invention, these functions may be integrated in the gateway 100.

FIG. 2 illustrates schematically a method 200 for associating a gathering node, for example the gathering node B5, in a distributed wireless communication network, for example the network 100, according to a first embodiment of the invention.

In a first step 201, the method 200 is initialised. This initialisation may consist of the pressing, by a user of the network 100, on a button present on one of the electronic devices of the network 100, for example on the management node or one of the gathering nodes, for example here the node B2, of the network 100. Thus, according to one embodiment of the invention, each gathering node comprises a button, the pressing by a user on this button causing the sending of a message comprising information that a new gathering node is to be associated with the network 100, said message being sent to the management node of the network 100. This message may possibly be broadcast in the network 100.

In a following step 202, the management node therefore receives the message comprising information that a new gathering node is to be associated.

Following receipt of this message, in a step 203, the management node sends, to each gathering node in the network 100, a command to activate a predefined so-called association radio-frequency interface. This so-called association interface is characterised by an SSID, and possibly an associated security key. The so-called association SSID, and possibly the associated security key, may be preconfigured during a phase of manufacture of the gathering nodes. The so-called association SSID, and possibly the associated security key, may be configured during a phase of parameterising the network 100, not described in the present document. In this case, the management node may receive said SSID and security key via a parameterising interface following the entry of a user of the network 100, and then preconfigure each gathering node with these elements. Alternatively, the configuration parameters of the association interface (SSID and security key) may be sent to each gathering node in association with the command activating said association interface. In other words, the activation command makes it possible to activate a so-called association wireless network on each gathering node, this association wireless network being different from the gathering wireless network and from the user wireless network.

In similar steps 204, the activation command is propagated gradually by the various gathering nodes in the network 100, until all the gathering nodes in the network 100 have been reached.

According to the embodiment of the invention, the command activating a radio-frequency interface is of the access-point type or user type. In other words, in the first case, the activation command sent makes it possible to configure each gathering node in the network 100 as an access point of the association wireless network. In the second case, each gathering node becomes a potential user node of the association wireless network, the latter then having to be established and managed by the new gathering node.

Thus, in a step 205, each gathering node, in the first case, becomes an access point of the association wireless network. In the second case, each gathering node seeks to detect the so-called association wireless network.

Following the initialisation step, requiring a physical pressing on a button, a user of the network 100 may have joined a position of installation of the new gathering node B5 and install the latter, particularly by powering it up in a step 206. The initialisation of the method (step 201) therefore does not require the new gathering node to be powered up, which is particularly advantageous if the physical position thereof is distant from the other gathering nodes in the network 100 (in a distant room or on an upper floor for example).

Once powered up, in a step 207, the new gathering node B5 seeks either to connect to the association wireless network (the first case) or establishes an access point for the association wireless network (the second case).

In the first case, the new gathering node B5 associates itself with a close-by gathering node on the so-called association wireless network (steps 208 and 209). In the second case, it is one of the gathering nodes that has detected the association wireless network created by the new gathering node that associates itself with the new gathering node B5 (not shown).

FIG. 2 illustrates the first case, from which the gathering nodes B1 and B2 are access points for the association wireless network. The new gathering node B5 detects said association wireless network and, in the case illustrated, decides to associate itself with the gathering node B1.

The gathering node B1 then sends a message to the management node indicating that a new gathering node has associated itself with the association wireless network.

In a step 210, the management node determines a validation of association of the new gathering node detected. The validation may consist of the display of a message on an interface of one of the nodes in the network 100 and/or of the sending of a light and/or audible signal. The validation may be performed by means of a management interface of the network 100, for example a configuration web interface supplied by the management node.

The validation may comprise the interrogation, by the management node, of the new gathering node B5 in order to recover information, such as for example an identifier associated with the gathering node B5. The identifier may for example be an MAC (media access control) address of the radio-frequency interface of the new gathering node B5. The management node may interrogate a remote database in order to know whether the gathering node B5 is indeed enabled to connect to the network 100. Information about the remote database may have been given at the time of purchase of the new gathering node by a user. In this case, the user or an operator providing for example access to the internet and the various electronic devices constituting the network 100 may have supplied an identifier of the network 100 at the time of the purchase, this being recorded in the database in association with an identifier of the new gathering node purchased. Thus a new gathering node cannot be associated with a network other than the network 100, whether by error or following an attempt at connection of the gathering node to an adjacent network.

If the validation step 210 is successful, then a management node sends to the new gathering node B5 information on parameterisings comprising at least information necessary for an association of the new node with the gathering wireless network of the communication network. This information typically comprises the SSID and a security key associated with the gathering wireless network.

Following this step 211, the new gathering node B5 may, in the steps 212 and 213, be associated with the gathering wireless network via the access point of the radio-frequency interface of the gathering node B1.

The gathering node may, either during the step 211, or subsequently to the steps 212 and 213, that is to say once the gathering node B5 is associated with the gathering network, send a configuration message comprising information necessary for configuring an access-point radio-frequency interface of the user wireless network of the network 100. In other words, the management node may send a message with the SSID and the associated security key in order to create an access point enabling user nodes to associate themselves with the new gathering node in a similar manner to the other gathering nodes.

FIG. 3 illustrates schematically a method 300 for association of a gathering node, for example the gathering node B5, in a distributed wireless communication network 100, in accordance with a second embodiment of the invention.

The method 300 offers more protection compared with the method 200 described previously.

According to the second embodiment of the invention, the new gathering node B5 comprises a radio tag (or RFID tag, standing for radio-frequency identification tag), the radio tag comprising information associated with the new gathering node B5 to be associated. Likewise, at least one gathering node or the management node of the communication network 100 comprises a radio-tag reader.

According to an alternative embodiment of the invention, the radio tag is replaced by a QR code (or bar code), and the radio-tag reader may be a QR-code reader.

The method 300, like the method 200, begins with a step 301 of initialising the method. This step 301 is however different in that it consists of the reading, by a gathering node or the management node comprising a radio-tag reader, of the radio tag of the new gathering node B5. A unique identifier associated with the new gathering node B5 may be included among the information included in the radio tag.

In a step 302, the gathering node that read the radio tag sends, to the management node, or possibly broadcasts, a message comprising an indication that a new gathering node is to be associated, the message also comprising all or some of the information included in the radio tag read by the gathering node.

The management node receives said message. The management node may, in a step 303, proceed with a check that the new gathering node is enabled to associate itself with the network 100. This step may take several forms.

According to one form, an indication is given, by a light and/or audible signal on one of the nodes in the network 100, that a new gathering node is seeking to associate itself with the network 100. A user of the network 100 may then have to perform a predefined action to allow continuation of the method 300, or, on the contrary, perform a predefined action within a given time in order to stop the execution of the method 300. The interaction with the user may take place by means of a management interface of the network 100, for example a web interface.

According to another form, the management node may check that information received during the step 302 does indeed correspond to a predefined criterion. For example, if an identifier supplied is an MAC address, the management node may make the continuation of the method 300 dependent on the MAC address corresponding to a predefined manufacturer. According to a variant, the management node may interrogate a remote database in order to check whether an identifier received during the step 302 is indeed recorded in association with an identifier of the network 100. This recording may have been done previously when the new gathering node was purchased by a user of the network, or subsequently, by a parameterising by the user of the network via a configuration interface of the network.

In this case, the management node determines a validation of association of the new gathering node with the communication network according to the information associated with the new gathering node to be associated and an identifier associated with the communication network.

If the validation is successful, then the management node passes to the step 304, the management node sending, to each gathering node in the network 100, a command activating a so-called association radio-frequency interface. Unlike the step 203 of the method 200, the SSID and security-key parameters of the association wireless network may have been recovered in the information received during the step 302. In other words, the SSID and security-key parameters of the association wireless network may be encoded in the radio tag of the new gathering node B5.

In steps 305, the activation command is propagated in the wireless network gradually, in an identical fashion to the step 204.

The steps 306, 307, 308, 309 and 310 are similar to the corresponding steps 205, 206, 207, 208 and 209 of the method 200, except that the SSID and security-key parameters of the association wireless network may have been defined according to information encoded in the radio tag. In this case, the new gathering node B5 is preconfigured so that the SSID information and associated security key correspond to the association wireless network.

In order to reinforce the security of the association method, the method 300 comprises a step 311 of establishing a secure connection between the new gathering node and the management node. The secure connection may be established by any known means, for example via the establishment of a TLS (Transport Layer Security) or SSL (Secure Sockets Layer) tunnel. The secure connection may be established by means of the secure software bus described in the European patent application EP 2 791 798.

The step 312 of checking the association authorisation is similar to the step 210 of the method 200, except that information received in the step 302 may be used.

The steps 313, 314, 315, 316 and 317 are respectively similar to the steps 211, 212, 213, 214 and 215 of the method 200.

FIG. 4 illustrates schematically the hardware architecture of an electronic device or gathering node of a distributed wireless communication network, the gathering node being able to be the management node, and being adapted for executing all or some of the steps of the methods 200 or 300 illustrated in FIG. 2 or in FIG. 3.

Thus the electronic device 400 comprises, connected by a communication bus: a processor or CPU 401; a memory MEM 402 of the RAM (random access memory) and/or ROM (read only memory) type, possibly a network module NET 403, for example of the Ethernet type, a storage module STCK 404 of the internal storage type and possibly a plurality of radio-frequency modules 405 or 40N complying with a standard of the IEEE 802.11 type. The storage module STCK 404 may be of the hard disk HDD (hard disk drive) or SSD (solid-state drive) type, or of the external storage medium reader type, such as an SD (Secure Digital) card reader. The processor CPU 401 may record data, or information, in the memory MEM 402 or in the storage module STCK 404. The processor CPU 401 can read data recorded in the memory MEM 402 or in the storage module STCK 404. These data may correspond to configuration parameters. The network module NET 503, if present, typically allows connection of the electronic device 400 to a local network and/or the internet. Each radio-frequency module 405 to 40N enables the electronic device 400 to establish a plurality of radio-frequency interfaces in accordance with a so-called Wi-Fi standard. A radio-frequency interface may be a Wi-Fi access point, or on the other hand a so-called user radio-frequency interface allowing association with a so-called access-point radio-frequency interface of another electronic device.

The processor CPU 401 is capable of executing instructions loaded in the memory MEM 402, for example from the storage module STCK 404. When the electronic device 400 is powered up, the processor CPU 401 is capable of reading instructions from the memory MEM 402 and executing them. These instructions form a computer program causing the implementation, by the processor CPU 401, of all or some of the methods and steps described above, particularly the method described in FIG. 2 or the method described in FIG. 3. Thus all or some of the methods and steps described above can be implemented in software form by the execution of a set of instructions by a programmable machine, such as a DSP (digital signal processor) or a microcontroller. All or some of the methods and described here can also be implemented in hardware form by a machine or a dedicated component, such as an FPGA (field-programmable gate array) or an ASIC (application-specific integrated circuit). The functions of the electronic device 400 may be integrated in a node of a wireless network in accordance with an IEEE 802.11 standard by an updating of software, that is to say for example by updating the microprogram (firmware) of the electronic device 400.

The invention claimed is:

1. A method for associating a new gathering node in a distributed wireless communication network conforming to one of the IEEE 802.11 standards, comprising at least one gathering node that includes an existing gathering node, each gathering node of the communication network comprising at least one access-point and/or user radio-frequency interface of a gathering wireless network associated with a communication network and an access-point radio frequency interface of a user wireless network associated with the communication network, a gathering network identifier and a gathering security key associated with said gathering wireless network and, the method being executed by a management node of the communication network and comprising:

receiving, from a first gathering node, a message comprising information that the new gathering node is to be associated, sending, to each of the at least one gathering node in the communication network, a command to activate an association radio-frequency interface, said command allowing an activation of a wireless association network different from the gathering wireless network and from the user wireless network characterised by a predetermined network identifier called association network identifier, receiving, from a second gathering node different from the first gathering node, a message indicating that the new gathering node is associated with the existing gathering node via the association radio-frequency interface, determining a first validation of association of the new gathering node, sending to the new gathering node information on parameterisings comprising at least information necessary for an association of the new node with the gathering wireless network of the communication network responsive to the association being validated, said information on parameterisings comprising said gathering network identifier and said gathering security key.

2. The method according to claim 1, the command activating the association radio-frequency interface comprising:

a command activating a radio-frequency interface of the access-point type, or a command activating a radio-frequency interface of the user type.

3. The method according to claim 1, the message comprising information that a new gathering node is to be associated comprising information associated with the new gathering node to be associated, the method comprises a step prior to the sending of the command activating the association radio-frequency interface:

determining a second validation of association of the new gathering node with the communication network according to the information associated with the new gathering node to be associated and according to an identifier associated with the communication network, and ignoring the sending of the command activating the association radio-frequency interface in the event of the lack of a second validation.

4. The method according to claim 1, the message comprising information that a new gathering node is to be associated comprising configuration information for an association radio-frequency interface, the command activating a association radio-frequency interface comprising said configuration information.

5. The method according to claim 1, the method comprising a step, following the step of receiving a message indicating that a new gathering node is associated with an existing gathering node via its association radio-frequency interface, of:

establishing a secure connection between the management node and the new gathering node.

6. The method according to claim 3, the new gathering node comprising a radio tag, the radio tag comprising the information associated with the new gathering node to be associated, at least one gathering node of the communication network comprising a radio-tag reader, the message comprising information that a new gathering node is to be associated is sent by the gathering node comprising the radio-tag reader following the reading of the radio tag and comprising the information associated with the new gathering node to be associated.

7. A management node of a distributed wireless communication network conforming to one of the IEEE 802.11 standards, the communication network comprising at least one gathering node, each gathering node comprising at least one access-point and/or user radio-frequency interface of a gathering wireless network associated with the communication network and an access-point radio-frequency interface of a user wireless network associated with the communication network, the management node being adapted for executing the steps of the method according to claim 1.

8. The management node according to claim 1, the management node is one of the gathering nodes of the distributed wireless communication network.

9. A non-transitory storage medium whereon a computer program is stored, the computer program comprising instructions for implementing, by a processor of a management node of a distributed wireless communication network in accordance with one of the IEEE 802.11 standards comprising at least one gathering node, each gathering node comprising at least one access-point and/or a user radio-frequency interface of a gathering wireless network associated with the communication network and an access-point radio-frequency interface of a user wireless network associated with the communication network, the method according to claim 1 for associating a new gathering node, when the computer program is executed by the processor.

10. An existing gathering node of a distributed wireless communication network conforming to one of the IEEE 802.11 standards, the existing gathering node comprising at least one radio-frequency module adapted for a radio-frequency interface configuration, the existing gathering node comprising a radio tag, the radio tag comprising information on parameterising of an association wireless network, the existing gathering node of the communication network comprising at least one access-point and/or user radio-frequency interface of a gathering wireless network associated with a communication network and an access-point radio frequency interface of a user wireless network associated with the communication network, a gathering network identifier and a gathering security key being associated with said gathering wireless network, the existing gathering node being adapted for, following a powering up:

sending, to a management node of the communication network, a message comprising information that a new gathering node is to be associated, receiving, from the management node in the communication network, a command to activate an association radio-frequency interface, said command allowing an activation of a wireless association network different from the gathering wireless network and from the user wireless network characterised by a predetermined network identifier called association network identifier, and sending, to the management node, a message indicating that the new gathering node is associated with the existing gathering node via the association radio-frequency interface, wherein the management node determines a first validation of association of the new gathering node, and sends to the new gathering node information on parameterisings comprising at least information necessary for an association of the new node with the gathering wireless network of the communication network responsive to the association being validated, said information on parameterisings comprising said gathering network identifier and said gathering security key.

\* \* \* \* \*